United States Patent Office 3,137,314
Patented June 16, 1964

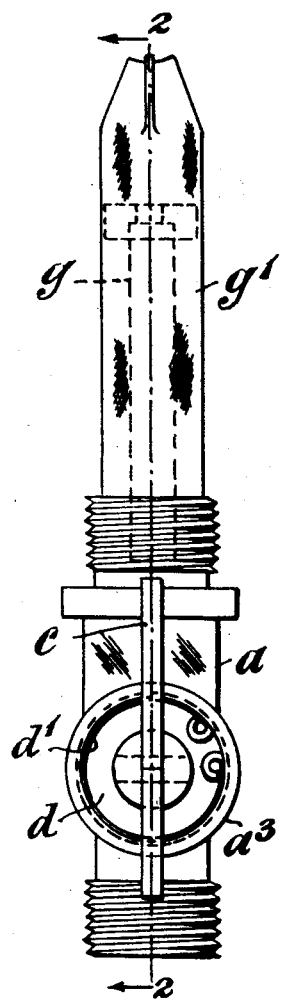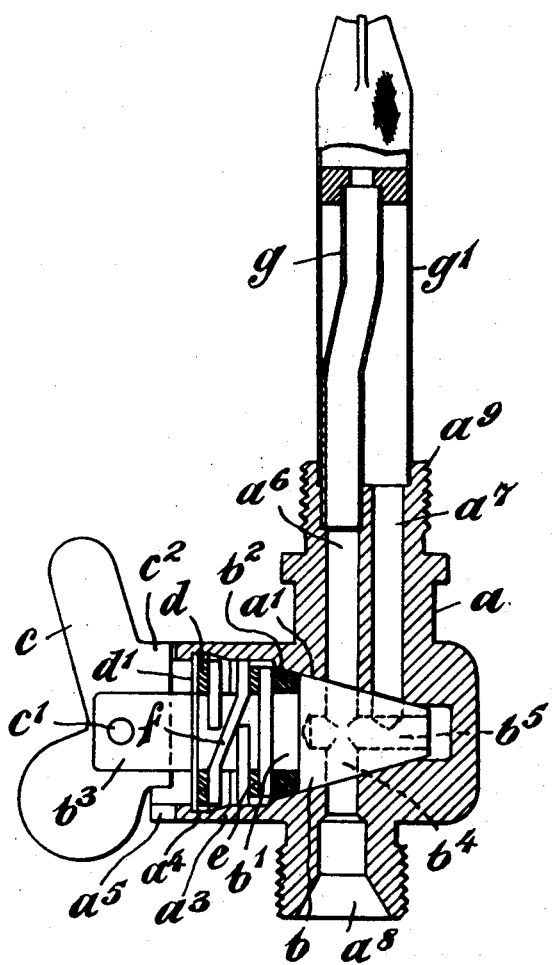

3,137,314
TAPS FOR LIQUIDS
Harold George Woodhall, Dudley, England, assignor to Ewarts Limited, Dudley, England, a British company
Filed June 21, 1961, Ser. No. 118,679
1 Claim. (Cl. 137—625.12)

The present invention has relation to taps for liquids, and has for its object to provide a tap more particularly suitable for use on a motor bicycle and the like and which may be of the kind known as a two-level tap wherein the tap body incorporates two inlet passageways which are adapted for communication at different levels with the interior of a tank or container with which the tap is to be associated, the tap providing for three settings, namely (a) a setting in which no flow is permitted from the tank or container (b) a setting in which flow is permitted from the tank or container from the higher level within the tank through the tap outlet passageway, but flow is prevented from the lower level adjacent the bottom of the tank, and (c) a setting in which flow is permitted from the lower level of the tank to the outlet passageway.

The present invention is however applicable to other types of taps such as an ordinary straight through tap or a branch tap, and has for its object to provide a tap of the type incorporating a tapering rotary plug for the control of the liquid which plug is very efficiently installed in its housing for the effective control of the liquid without leakage.

According to the present invention there is provided a tap for the control of a liquid comprising a tap body with tapering or conical cavity therein, an apertured tapering plug rotatable therein for the control of liquid led to and from the housing by inlet and outlet passages, the said plug being characterised by a sealing ring of rubber or like material which is located in an annular recess in that part of the plug which is of greater diameter, the said plug and sealing ring being operable by means of a finger controlled stem disposed within a cylindrical part of the body and being held in effective operative engagement with the tapering cavity in the body by a compression spring surrounding the stem and which bears directly or indirectly upon the head of the plug at one extremity and at its other extremity against a washer through which the stem passes and which washer itself is located in the cylindrical part of the body by means of a circlip engaging a shoulder in the said cylindrical part.

In order that the invention may be clearly understood and readily carried into practice, reference may be had to the appended explanatory drawings, in which:

FIG. 1 illustrates in front elevation a two-level tap constructed according to the present invention.

FIG. 2 is a transverse sectional elevation taken on line 2—2 of FIG. 1.

In that embodiment of the invention illustrated there is provided a tap body $a$ having a cavity $a^1$ with a pronounced taper and incorporated in this tapered cavity $a^1$ is the tapering plug $b$ of a corresponding conicity. The tapering plug $b$ has an annular recess $b^1$ and into this recess $b^1$ a sealing ring $b^2$ of rubber or the like is located. The plug $b$ is provided with a cylindrical extension $b^3$ for its manipulation by means of a handle member $c$. Surrounding the extension $b^3$ is a part of the body indicated by the reference letter $a^3$ and this cylindrical part is recessed at $a^4$ for the reception of a washer $d$ which is located by a circlip $d^1$. $e$ is a further washer which rests upon the top of the tapering plug and interposed between the washers $d$ and $e$ is the coiled compression spring $f$. To locate the operative part of the mechanism the plug is inserted in its cavity $a^1$ and the washer $e$ placed in position and then the spring $f$ followed by the washer $d$ and circlip $d^1$.

It will be noted that the handle member $c$ is secured at $c^1$ and has a shoulder $c^2$, which operates in a slot $a^5$ in the cylindrical part of the body so that the plug $b$ can be rotated through a predetermined angle from one terminal position to another.

$a^6$ is the primary passage through the body $a$ and $a^7$ a secondary passage. Connected to the passage $a^6$ is the tube $g$ and said tube is surrounded by a gauze member $g^1$. $b^4$ is a passage through the plug and $b^5$ a further passage leading from $a^7$ to $b^4$.

When the handle member is in the position shown in FIG. 2 liquid flows through the passage $a^7$, passage $b^5$ and $b^4$ to the outlet $a^8$. When the handle $c$ is turned through 180° the passage $b^5$ is cut off and liquid flows only through passages $a^6$, $b^4$ and $a^8$, this being the normal position of usage, it being appreciated that when the liquid falls below the level of the tube $g$, supply to the tube $g$ ceases, and the reserve supply can only be brought into use by turning the handle into the position shown in the drawing.

Normally the body of the tap is screwed into the bottom of the tank at $a^9$ so that the parts $g$, $g^1$ protrude well into the tank. In addition to the two settings of the tap referred to a third setting is or may be provided wherein a plain part of the plug $b$ closes the passages $a^6$, $a^7$ for complete shutting off the fuel.

Although the invention has been described with reference to a two level tap, it is equally applicable to a straight through tap that is to say a tap avoiding the features $g$, $g^1$, $a^7$. Further instead of providing a handle member such as $c$ a remote control may be provided for the part $b^3$ as is sometimes desirable in the case of motor scooters, mopeds and the like.

The passages provided in the plug and construction of the body may vary considerably. In some instances it may be desirable for the incoming petrol to enter an aperture in the rotary plug and flow through an axial aperture in the plug into an outlet of the body disposed axially of the plug.

I claim:

A tap comprising, in combination, a tap body with a tapered internal wall and a second internal and part cylindrical wall together defining a chamber, an apertured plug including a plug section seated on a portion of the tapered wall and an integral stem together rotatable for the control of liquid led to and from the tap body, the plug section having an annular groove in its part of greatest diameter, a resilient sealing ring located and held in the annular groove and seated on the tapered wall, a coil spring located about the plug stem urging the plug section and ring into operative engagement with the tapered wall, a pair of washers one on each side of the coil spring, one of the washers abutting the plug section, an end coil of the spring engaging the cylindrical part of the second wall to center the spring relative to the plug member axis, the remainder of the spring being free and spaced from the said second wall, and circlip means engaged with the tap body and abutting the other of said washers to hold the spring in compression.

References Cited in the file of this patent

UNITED STATES PATENTS

| | | |
|---|---|---|
| 913,861 | Wakfer | Mar. 2, 1909 |
| 1,672,079 | Nelson | June 5, 1928 |
| 2,313,257 | Nelson | Mar. 9, 1943 |
| 2,931,380 | Mueller et al. | Apr. 5, 1960 |
| 2,980,390 | Anderson et al. | Apr. 18, 1961 |

FOREIGN PATENTS

| | | |
|---|---|---|
| 32,196 | Germany | 1885 |
| 677,655 | Great Britain | Aug. 20, 1952 |